(12) United States Patent
Naruse et al.

(10) Patent No.: US 11,801,558 B2
(45) Date of Patent: Oct. 31, 2023

(54) THREE-DIMENSIONAL POWDER BED FUSION ADDITIVE MANUFACTURING APPARATUS

(71) Applicant: JEOL Ltd., Tokyo (JP)

(72) Inventors: Tatsuo Naruse, Tokyo (JP); Ayumu Miyakita, Tokyo (JP); Yohei Daino, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/886,781

(22) Filed: Aug. 12, 2022

(65) Prior Publication Data

US 2023/0049933 A1 Feb. 16, 2023

(30) Foreign Application Priority Data

Aug. 13, 2021 (JP) .................. 2021-131895

(51) Int. Cl.
*B22F 10/322* (2021.01)
*B22F 12/20* (2021.01)
*B22F 10/47* (2021.01)
*B22F 12/30* (2021.01)
*B33Y 10/00* (2015.01)
*B33Y 30/00* (2015.01)

(52) U.S. Cl.
CPC ............ *B22F 10/322* (2021.01); *B22F 10/47* (2021.01); *B22F 12/20* (2021.01); *B22F 12/30* (2021.01); *B22F 2201/01* (2013.01); *B33Y 10/00* (2014.12); *B33Y 30/00* (2014.12)

(58) Field of Classification Search
CPC ........ B22F 10/322; B22F 12/20; B22F 10/47; B22F 12/30; B22F 2201/01; B33Y 10/00; B33Y 30/00
See application file for complete search history.

(56) References Cited

U.S. PATENT DOCUMENTS

2012/0090734 A1 4/2012 Heinlein
2020/0061922 A1 2/2020 Meiners et al.

FOREIGN PATENT DOCUMENTS

| EP | 3587004 A1 | 1/2020 |
| JP | 2015193134 A | 11/2015 |
| JP | 202142465 A | 3/2021 |
| WO | 2019159635 A1 | 8/2019 |
| WO | WO-2019159635 A1 * | 8/2019 |

OTHER PUBLICATIONS

Extended European Search Report issued in EP22189578.2 dated Oct. 13, 2022.

* cited by examiner

*Primary Examiner* — Anthony M Liang
*Assistant Examiner* — Danny N Kang
(74) *Attorney, Agent, or Firm* — THE WEBB LAW FIRM

(57) ABSTRACT

A three-dimensional PBF-AM apparatus includes a stage on which a powder material is spread, and a tubular build box disposed in a state of surrounding the stage. The build box includes a side wall portion having a first tubular member surrounding the stage and a second tubular member surrounding the stage with the first tubular member interposed therebetween and forming a space with the first tubular member, and moreover, a vacuum heat insulating layer can be formed inside the side wall portion by vacuuming the space.

4 Claims, 7 Drawing Sheets

THREE-DIMENSIONAL POWDER BED FUSION ADDITIVE MANUFACTURING APPARATUS

CROSS REFERENCE TO RELATED APPLICATION

The application claims priority to Japanese Patent Application No. 2021-131895, filed Aug. 13, 2021, the disclosure of which is hereby incorporated by reference in its entirety.

BACKGROUND OF THE INVENTION

Field of the Invention

The present invention relates to a three-dimensional powder bed fusion additive manufacturing (PBF-AM) apparatus.

Description of Related Art

In recent years, there has been known a three-dimensional powder bed fusion additive manufacturing (PBF-AM) apparatus that irradiates a powder material spread in layers with a beam to melt and solidify the powder material, and sequentially stacks solidified layers to form a manufactured object having a three-dimensional structure (see, for example, JP 2021-42465 A).

In the three-dimensional PBF-AM apparatus, a powder material is spread on a stage surrounded by a build box, and the powder material is irradiated with a beam to heat the powder material. At this time, heat input by the irradiation of the beam is desirably as small as possible from the viewpoint of the quality of the manufactured object, building time, environmental load, and the like.

However, in the conventional three-dimensional PBF-AM apparatus, a part of the heat input by the irradiation of the beam flows out from the build box as radiant heat. Therefore, it cannot be said that the heat input during building is always efficiently used.

SUMMARY OF THE INVENTION

The present invention has been made to solve the problems above, and an object of the present invention is to provide a three-dimensional PBF-AM apparatus capable of more efficiently using the heat input during the building than before.

The present invention is a three-dimensional PBF-AM apparatus including a stage on which a powder material is spread, and a tubular build box disposed in a state of surrounding the stage. The build box includes a side wall portion having a first tubular member that surrounds the stage and a second tubular member that surrounds the stage via the first tubular member and forms a space with the first tubular member, and is configured to be able to form a vacuum heat insulating layer inside the side wall portion by vacuuming the space.

According to the present invention, the heat input during the building can be more efficiently used than in the conventional art.

DESCRIPTION OF THE INVENTION

Hereinafter, embodiments of the present invention will be described in detail with reference to the drawings. In the present description and the drawings, elements having substantially the same function or configuration are denoted by the same numerals, and redundant description is omitted.

First Embodiment

Figure 1:
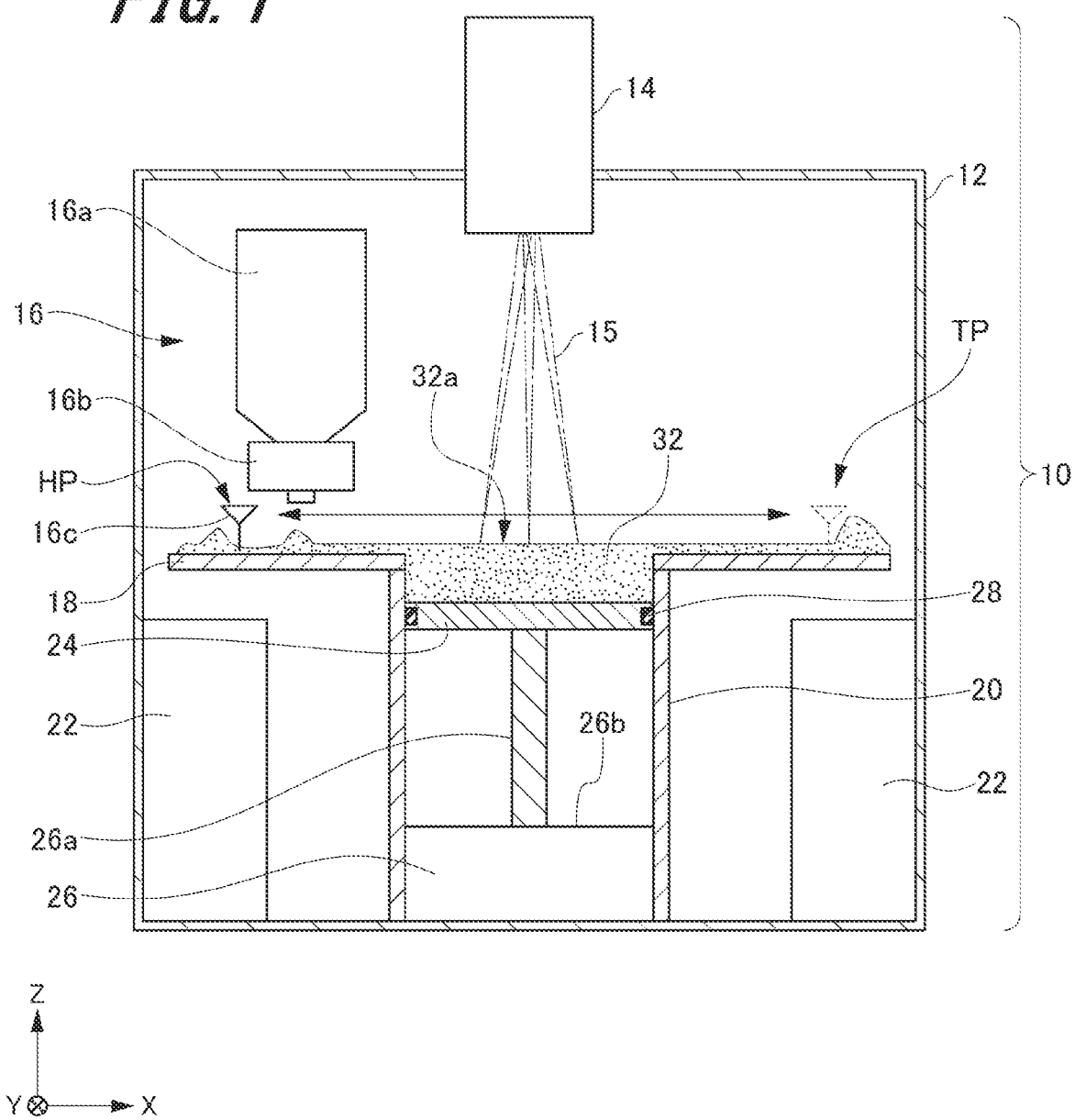
FIG. 1 is a side view schematically showing a configuration of a three-dimensional PBF-AM apparatus according to a first embodiment of the present invention.

FIG. 1 is a side view schematically illustrating a configuration of a three-dimensional PBF-AM apparatus according to a first embodiment of the present invention. In the following description, in order to clarify shapes, positional relationship, and the like of each part of the three-dimensional PBF-AM apparatus, a horizontal direction in FIG. 1 is referred to as an X direction, a depth direction in FIG. 1 is referred to as a Y direction, and a vertical direction in FIG. 1 is referred to as a Z direction. The X direction, the Y direction, and the Z direction are directions orthogonal to each other. Furthermore, the X direction and the Y direction are parallel to a horizontal direction, and the Z direction is parallel to a vertical direction.

As illustrated in FIG. 1, the three-dimensional PBF-AM apparatus 10 includes a vacuum chamber 12, a beam irradiation device 14, a powder supply device 16, a building table 18, a build box 20, a collection box 22, a stage 24, and a stage moving device 26.

The vacuum chamber 12 is a chamber for creating a vacuum state by evacuating air in the chamber using the vacuum pump (not illustrated).

The beam irradiation device 14 is a device that irradiates a manufactured surface 32a with the electron beam 15. The manufactured surface 32a corresponds to an upper surface of a metal powder 32 spread on the stage 24. Although not illustrated, the beam irradiation device 14 includes an electron gun that is a generation source of the electron beam and an optical system that controls the electron beam generated by the electron gun. The optical system includes a focusing lens, an objective lens, a deflection lens, and the like. The focusing lens is a lens that focuses an electron beam 15 generated by the electron gun. The objective lens is a lens for focusing the electron beam 15 focused by the focusing lens in the vicinity of the manufactured surface 32a. The deflection lens is a lens that deflects the electron beam 15 to cause the electron beam 15 to scan on the manufactured surface 32a.

The powder supply device 16 is a device that supplies a metal powder 32 as a powder material to be a raw material of the manufactured object onto the building table 18. The powder supply device 16 includes a hopper 16a, a powder drop device 16b, and an arm 16c. The hopper 16a is a container for storing the metal powder. The powder drop device 16b is a device that drops the metal powder stored in the hopper 16a onto the building table 18. The arm 16c is a long-shaped member elongated in the Y direction. The arm 16c spreads the metal powder dropped by the powder drop device 16b on the building table 18 and the stage 24. The arm 16c is provided to be movable in the X direction in order to uniformly spread the metal powder on the entire surface of the building table 18 and the stage 24.

The building table 18 is horizontally disposed inside the vacuum chamber 12. The building table 18 is disposed below the powder supply device 16. A central portion of the building table 18 is opened. An opening shape of the building table 18 is circular in plan view or angular in plan view.

The build box 20 is a box that forms a space for manufacturing. The build box 20 is formed in a tubular shape. The build box 20 is disposed in a state of surrounding the stage 24. A cross-sectional shape of the build box 20 is the same as the opening shape of the building table 18. For example, when the opening shape of the building table 18 is circular in plan view, the cross-sectional shape of the build box 20 is circular, and when the opening shape of the building table 18 is angular in plan view, the cross-sectional shape of the build box 20 is angular. In the present embodiment, as an example, it is assumed that the cross-sectional shape of the build box 20 is circular, that is, the build box 20 is formed in a tubular shape. An upper end portion of the build box 20 is connected to an opening edge of the building table 18.

The collection box 22 is a box that recovers the excess metal powder 32 among the metal powders 32 supplied onto the building table 18 by the powder supply device 16. One collection box 22 is provided on each of one side and the other side in the X direction.

The stage 24 is provided to be movable in the vertical direction (the Z direction). The stage 24 slides in the vertical direction along an inner peripheral surface of the build box 20. A seal member 28 is attached to an outer peripheral portion of the stage 24. The seal member 28 is a member that maintains slidability and sealability between the outer peripheral portion of the stage 24 and the inner peripheral surface of the build box 20. The seal member 28 is made of a material having heat resistance and elasticity.

The stage moving device 26 is a device that moves the stage 24 in the vertical direction. The stage moving device 26 includes a shaft 26a and a drive mechanism unit 26b. The shaft 26a is connected to a lower surface of the stage 24. The drive mechanism unit 26b includes a motor and a power transmission mechanism (not illustrated), and drives the power transmission mechanism using the motor as a drive source to move the stage 24 integrally with the shaft 26a in the vertical direction. The power transmission mechanism includes, for example, a rack and pinion mechanism, a ball screw mechanism, and the like.

Next, basic procedures in a case of forming the manufactured object having a three-dimensional structure using the three-dimensional PBF-AM apparatus 10 having the configuration described above will be described.

First, the metal powder 32 is spread in layers on the stage 24 in a state where the upper surface of the stage 24 is lower than the upper surface of the building table 18. At this time, the powder supply device 16 operates as follows. First, the metal powder stored in the hopper 16a is weighed by the powder drop device 16b, so that a predetermined amount of the metal powder 32 is dropped from the powder drop device 16b onto the building table 18. Next, the arm 16c reciprocates in the X direction. Specifically, the arm 16c moves from a home position HP to a turning position TP, and then returns from the turning position TP to the home position HP. Accordingly, the metal powder 32 is uniformly spread over the entire surfaces of the building table 18 and the stage 24. In addition, the excess metal powder 32 is recovered in the collection box 22.

Next, the beam irradiation device 14 irradiates the upper surface (the manufactured surface 32a) of the metal powder 32 with the electron beam 15 to pre-sinter the metal powder 32. At this time, the beam irradiation device 14 irradiates a wider range than a target manufactured object with the electron beam 15, and defocuses the electron beam 15 such that the metal powder 32 is not excessively heated.

Next, the beam irradiation device 14 irradiates the upper surface of the metal powder 32 with the electron beam 15 to melt and solidify the metal powder 32 as a pre-sintered body. This step is also referred to as a main sintering step. In the main sintering step, the beam irradiation device 14 scans the electron beam 15 based on two-dimensional data obtained by slicing three-dimensional Computer-Aided Design (CAD) data of the target manufactured object to a certain thickness, thereby selectively melting the metal powder 32 on the stage 24. The metal powder 32 melted by the irradiation of the electron beam 15 is solidified after the electron beam 15 passes.

Next, as a preparation for spreading the metal powder 32 of the next layer, the beam irradiation device 14 irradiates the upper surface of the metal powder 32 with the electron beam 15 to preheat the metal powder 32. At this time, the beam irradiation device 14 defocuses the electron beam 15.

Next, the stage moving device 26 lowers the stage 24 by a predetermined amount. The predetermined amount corresponds to a thickness of one layer when the manufactured object is built by lamination.

Thereafter, the above operation is repeated until the building of the manufactured object is completed. The building of the manufactured object is completed when the metal powder 32 is melted and solidified by the number of layers necessary for the building of the manufactured object. Thus, the target manufactured object is obtained.

As described above, it is necessary to repeatedly perform the pre-sintering, the main sintering, or the preheating of the metal powder 32 and to input the heat by irradiation of the electron beam 15 each time until the building of the manufactured object is completed. At this time, when a part of the heat input flows out from the build box 20 to the outside as the radiant heat, it is necessary to input a larger amount of heat, which is not preferable from the viewpoint of thermal efficiency. Therefore, in the present embodiment, the following configuration is adopted.

Figure 2:
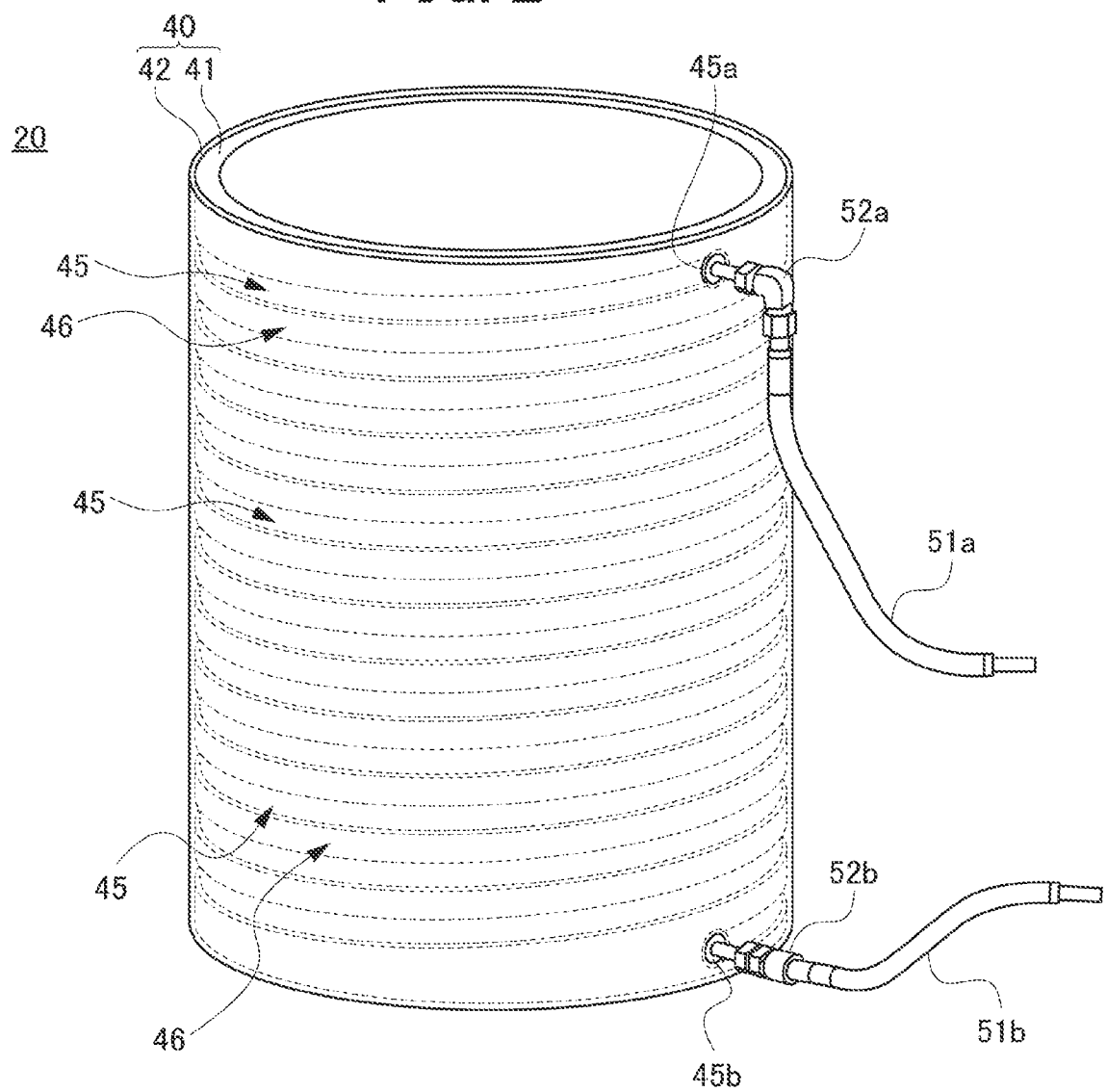
FIG. 2 is a perspective view illustrating a configuration of a build box provided in the three-dimensional PBF-AM apparatus according to the first embodiment of the present invention.
Figure 3:
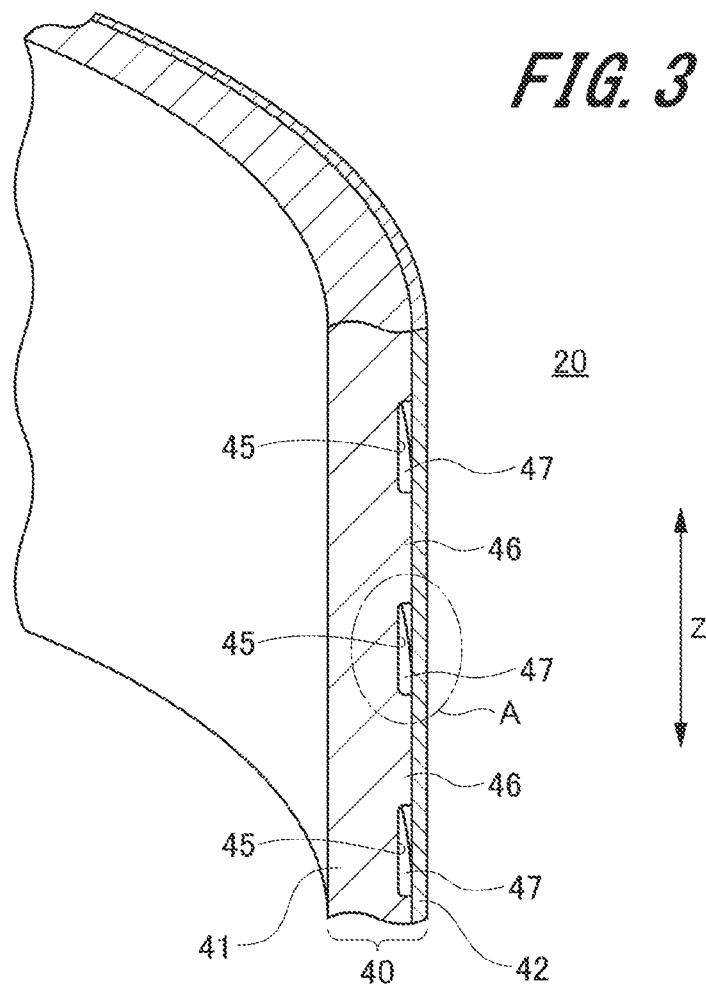
FIG. 3 is a longitudinal sectional view in which a part of the build box illustrated in FIG. 2 is enlarged.

FIG. 2 is a perspective view illustrating a configuration of the build box 20 included in the three-dimensional PBF-AM apparatus 10 according to the first embodiment of the present invention, and FIG. 3 is a longitudinal sectional view in which a part of the build box 20 illustrated in FIG. 2 is enlarged.

As illustrated in FIGS. 2 and 3, the build box 20 is formed in a tubular shape. The build box 20 includes a side wall portion 40. The side wall portion 40 has an appropriate thickness in order to secure mechanical strength enough to withstand pressure received from the metal powder 32 during the building and to suppress deformation due to heat.

The side wall portion 40 has a two-layer structure. Specifically, the side wall portion 40 includes a tubular inner pipe 41 and a tubular outer pipe 42 having an outer diameter larger than that of the inner pipe 41. As illustrated in FIG. 1 above, when the stage 24 is disposed inside the build box 20, the inner pipe 41 is disposed in such a way to surround the stage 24, and the outer pipe 42 is disposed in such a way to surround the stage 24 via the inner pipe 41.

The inner pipe 41 corresponds to the first tubular member, and the outer pipe 42 corresponds to the second tubular member. Furthermore, the inner peripheral surface of the inner pipe 41 corresponds to the inner surface of the first tubular member, and an outer peripheral surface of the inner pipe 41 corresponds to an outer surface of the first tubular member. Moreover, the inner peripheral surface of the outer pipe 42 corresponds to the inner surface of the second tubular member, and the outer peripheral surface of the outer pipe 42 corresponds to the outer surface of the second tubular member.

The inner pipe 41 and the outer pipe 42 are both made of metal (including alloy). As an example of the metal constituting the inner pipe 41 and the outer pipe 42, stainless steel can be exemplified.

The inner pipe 41 is formed to be thicker than the outer pipe 42. The inner peripheral surface of the inner pipe 41 is a curved surface without unevenness such that the stage 24 can smoothly move by sliding of a seal member 28 described above. On the other hand, a groove 45 is formed on the outer peripheral surface of the inner pipe 41. The groove 45 is formed in a spiral shape around a center axis of the build box 20. The groove 45 has a depth represented in units of mm, that is, a depth having a dimension on the order of mm. As a longitudinal cross-sectional shape of the groove 45, for example, any shape such as a quadrangle, a semicircle, or a triangle can be adopted. Furthermore, the width and depth of the groove 45 can be arbitrarily changed within a range in which a refrigerant to be described later can flow. Moreover, the groove 45 is preferably formed in the spiral shape in consideration of ease of flow of a refrigerant to be described later or the like, but may be formed in a shape other than the spiral shape.

One end portion 45a in a length direction of the groove 45 is disposed in the vicinity of the upper end portion of the build box 20, and the other end portion 45b in the length direction of the groove 45 is disposed in the vicinity of the lower end portion of the build box 20. Furthermore, the groove 45 is formed continuously from the one end portion 45a to the other end portion 45b. In the present embodiment, since the groove 45 is formed in the spiral shape on the outer peripheral surface of the inner pipe 41, the length direction of the groove 45 is a spiral direction along the outer peripheral surface of the inner pipe 41.

Furthermore, ridge units 46 are formed on the outer peripheral surface of the inner pipe 41. The ridge units 46 are formed adjacent to the groove 45 in the Z direction. The ridge units 46 are formed in a spiral shape similarly to the groove 45. The ridge units 46 protrude radially outward from a bottom surface of the groove 45 with the same dimension as the depth of the groove 45. In other words, the outer peripheral surface of the inner pipe 41 has an uneven structure in which the grooves 45 and the ridge units 46 are alternately arranged in the Z direction.

The outer pipe 42 is disposed in such a way to cover the entire outer peripheral surface of the inner pipe 41. The outer pipe 42 is joined to the inner pipe 41 by welding, thereby sealing upper and lower ends of the build box 20. More specifically, the upper end portion of the build box 20 is sealed in a way not to leak fluid such as gas or liquid by welding an upper end surface of the inner pipe 41 and the upper end surface of the outer pipe 42 over the entire circumference of the build box 20. Similarly, the lower end portion of the build box 20 is sealed in a way not to leak the fluid by welding the lower end surface of the inner pipe 41 and the lower end surface of the outer pipe 42 over the entire circumference of the build box 20. In addition, as a method of joining the inner pipe 41 and the outer pipe 42, a method other than welding may be adopted as long as the upper and lower ends of the build box 20 can be sealed.

The inner peripheral surface of the outer pipe 42 is curved without unevenness. Thus, when the outer pipe 42 is put on the outer peripheral surface of the inner pipe 41, a space 47 is formed between the inner pipe 41 and the outer pipe 42. The space 47 is a space formed by the groove 45 inside the side wall portion 40. Therefore, the space 47 is continuously connected from the one end portion 45a to the other end portion 45b in the length direction of the groove 45.

Figure 4:
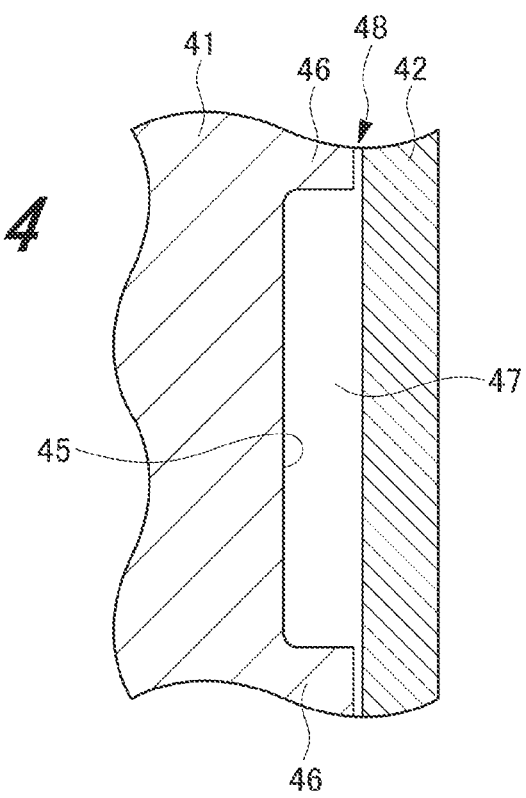
FIG. 4 is an enlarged view of the portion A in FIG. 3.

Furthermore, as illustrated in FIG. 4, the outer peripheral surface of the inner pipe 41 and the inner peripheral surface of the outer pipe 42 face each other with a gap 48 interposed therebetween except a formation portion of the groove 45. In other words, the ridge units 46 of the inner pipe 41 face the inner peripheral surface of the outer pipe 42 via the gap 48. The gap 48 is a minute gap represented in units of µm, that is, a gap having a dimension on the order of µm. In other words, the dimension of the gap 48 is sufficiently smaller than the depth of the groove 45. In addition, even when cross-sectional areas of the groove 45 and the gap 48 are compared, the cross-sectional area of the gap 48 is sufficiently smaller than the cross-sectional area of the groove 45.

Two connection pipes 51a and 51b are connected to the outer pipe 42. One of the two connection pipes 51a and 51b corresponds to a first connection pipe, and the other corresponds to a second connection pipe. The connection pipe 51a communicates with the one end portion 45a of the groove 45 via a joint 52a, and the connection pipe 51b communicates with the other end portion 45b of the groove 45 via a joint 52b. Here, the "communicate" refers to a state of being spatially connected. The joint 52a is attached to the outer pipe 42 to connect the connecting pipe 51a, and the joint 52b is attached to the outer pipe 42 to connect the connecting pipe 51b.

Figure 5:
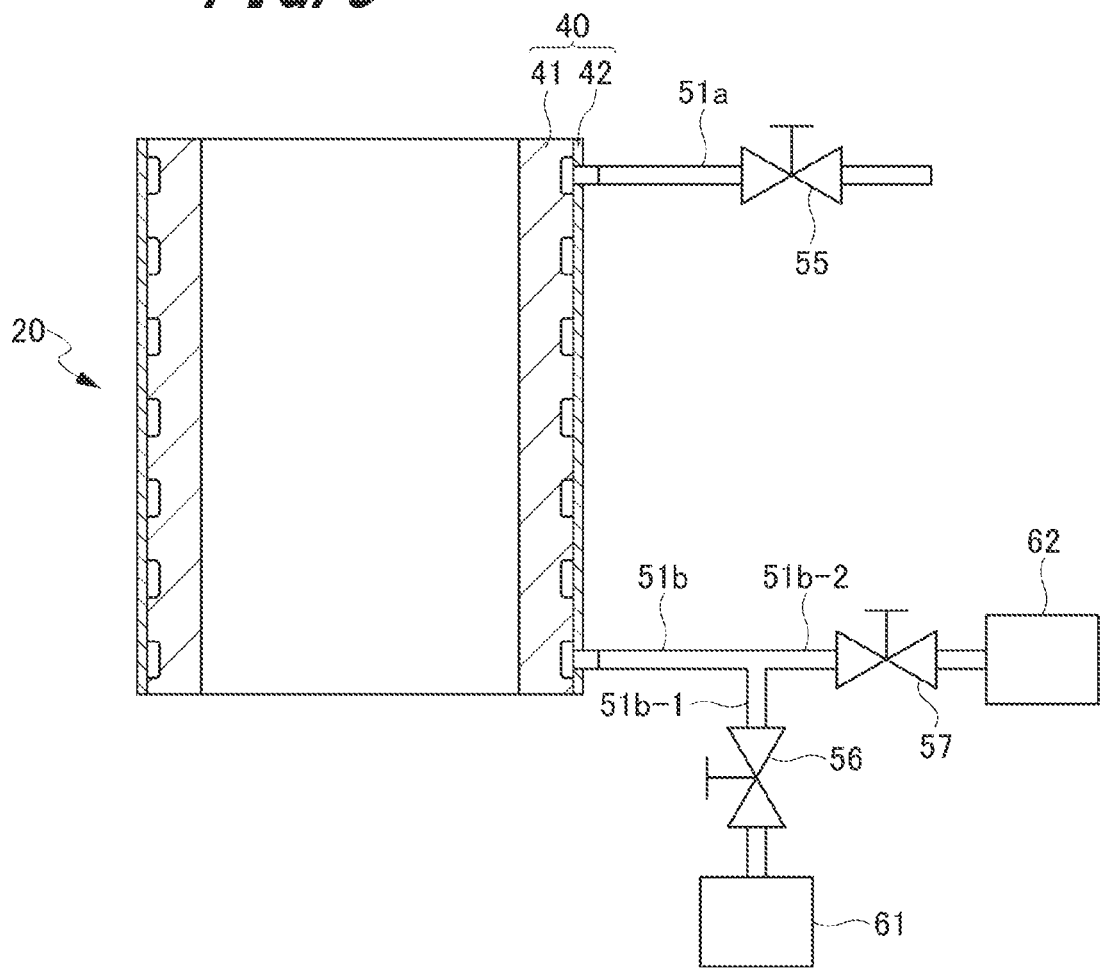
FIG. 5 is a schematic view illustrating a configuration example of a fluid pressure circuit included in the three-dimensional PBF-AM apparatus according to the first embodiment of the present invention.

FIG. 5 is a schematic view illustrating a configuration example of a fluid pressure circuit included in the three-dimensional PBF-AM apparatus 10 according to the first embodiment of the present invention.

As illustrated in FIG. 5, a fluid pressure circuit 50 includes two connection pipes 51a and 51b connected to the outer pipe 42 in such a way to communicate with the groove 45 described above, three valves 55, 56, and 57, a vacuum pump 61, and a refrigerant supply unit 62. The valve 55 is provided in the connection pipe 51a. A terminal portion of the connection pipe 51a is opened to the atmosphere.

On the other hand, the connection pipe 51b has a branch unit 53, and is branched into a connection pipe 51b-1 and a connection pipe 51b-2 at the branch unit 53. The valve 56 is provided in the connection pipe 51b-1, and the valve 57 is provided in the connection pipe 51b-2. The connection pipe 51b-1 is connected to the vacuum pump 61 via the valve 56. The connection pipe 51b-2 is connected to the refrigerant supply unit 62 via the valve 57.

The vacuum pump 61 is a pump for vacuuming the groove 45. The refrigerant supply unit 62 is a portion that supplies the refrigerant to the groove 45. The refrigerant supplied by the refrigerant supply unit 62 may be liquid such as water or gas such as air. Each of the valves 55, 56, and 57 is desirably configured by a vacuum valve in such a way to withstand the vacuuming using the vacuum pump 61.

Next, a three-dimensional PBF-AM method using the fluid pressure circuit 50 having the configuration above will be described.

To start with, when starting the building of the manufactured object by the three-dimensional PBF-AM apparatus 10, the valve 55 and the valve 57 are both closed at the very beginning, then the valve 56 is opened, and the vacuum pump 61 is operated. Accordingly, the space 47 formed by the groove 45 is vacuumed in the side wall portion 40 of the build box 20. Furthermore, the space 47 formed by the groove 45 is connected to the gap 48. Accordingly, when the groove 45 is vacuumed by the vacuum pump 61, the portion of the gap 48 is also vacuumed. As a result, the vacuum heat insulating layer is formed inside the side wall portion 40 of the build box 20. The vacuum heat insulating layer is formed on both the portions where the groove 45 and the space 47 are formed and the formation portion of the gap 48, that is, on the entire region of the side wall portion 40.

By forming the vacuum heat insulating layer inside the side wall portion 40 in this manner, heat insulating property of the build box 20 is greatly improved. Therefore, the heat in the build box 20 is difficult to escape to the outside of the build box 20. When forming the manufactured object by the three-dimensional PBF-AM apparatus 10, the building of the manufactured object is started in a state where the vacuum heat insulating layer is formed in the side wall portion 40, and this state is maintained until the building of the manufactured object is completed. In other words, during the building of the manufactured object, a state in which the vacuum heat insulating layer is formed inside the side wall portion 40 is maintained. Accordingly, it is possible to reduce the heat flowing out to the outside as the radiant heat from the build box 20 among the heat input by the irradiation of the electron beam 15 during the building. Therefore, the heat input during the building can be more efficiently used than in the conventional art.

However, when a state in which the vacuum heat insulating layer is formed is maintained in the side wall portion 40 after the building of the manufactured object is completed, the temperature of the molding object is difficult to lower. Therefore, it takes a long time until the manufactured object can be taken out of the build box 20.

Therefore, when the building of the manufactured object is completed by the three-dimensional PBF-AM apparatus 10, the valve 55 and the valve 57 are both opened, the valve 56 is closed, and the refrigerant supply unit 62 is operated while maintaining the vacuum state in the vacuum chamber 12. Accordingly, the refrigerant is supplied from the refrigerant supply unit 62 to the groove 45 in the side wall portion 40 of the build box 20 through the connection pipe 51b.

In this manner, the build box 20 is cooled by supplying the refrigerant to the groove 45 in the side wall portion 40 of the build box 20. In this way, the temperature of the manufactured object can be quickly lowered. Therefore, the time until the manufactured object can be taken out of the build box 20 can be shortened. Furthermore, in the conventional art, a technique of supplying an inert gas into the vacuum chamber 12 and cooling the manufactured object in the inert gas is also known, but in this conventional art, the manufactured object may be oxidized due to influence of impurities contained in the inert gas. On the other hand, in the present embodiment, since the inside of the vacuum chamber 12 is maintained in the vacuum state even after the building is completed, and the manufactured object is cooled in the vacuum, there is no concern that the manufactured object is oxidized.

In addition, in the present embodiment, the dimension of the gap 48 is very small as compared with the depth of the groove 45, and the cross-sectional areas of both are greatly different accordingly. Therefore, the refrigerant supplied through the connection pipe 51b easily flows to a portion where the groove 45 and the space 47 are formed, and is difficult to flow to the formation portion of the gap 48. Accordingly, even when the space 47 and the gap 48 passing thereto that are formed by the groove 45 are formed in the side wall portion 40 of the build box 20, the refrigerant can preferentially flow into the groove 45. Furthermore, even when a long refrigerant flow path is secured by the groove 45, the refrigerant can flow from one end to the other end in the length direction of groove 45. Thus, the entire build box 20 can be cooled by the refrigerant by forming the groove 45 over the entire build box 20. In particular, when the groove 45 is formed in the spiral shape, a curve of the groove 45 becomes gentle, the refrigerant easily flows, and a long flow path length of the refrigerant can be secured. Therefore, the manufactured object can be efficiently cooled by sufficient heat exchange.

From above, the three-dimensional PBF-AM apparatus 10 according to the first embodiment of the present invention can simultaneously obtain a first effect of improving the heat insulating property of the build box 20 and a second effect of shortening cooling time of the manufactured object, that is, two opposite effects.

Furthermore, in the first embodiment above, the connection pipe 51b is branched into two, the vacuum pump 61 is connected to the connection pipe 51b-1, and the refrigerant supply unit 62 is connected to the connection pipe 51b-2; but the configuration of the fluid pressure circuit 50 can be changed into many types. For example, the connection pipe 51a may be branched into two, the vacuum pump 61 may be connected to one connection pipe, and the refrigerant supply unit 62 may be connected to the other connection pipe. Furthermore, the vacuum pump 61 may be connected to one of the connection pipe 51a and the connection pipe 51b, and the refrigerant supply unit 62 may be connected to the other connection pipe.

Furthermore, in the first embodiment above, the terminal portion of the connection pipe 51a is opened to the atmosphere, but the present invention is not limited thereto; and the terminal portion of the connection pipe 51a may be connected to the refrigerant supply unit 62 by a circulation pipe (not illustrated) to circulate the refrigerant in the fluid pressure circuit 50.

Second Embodiment

Figure 6:
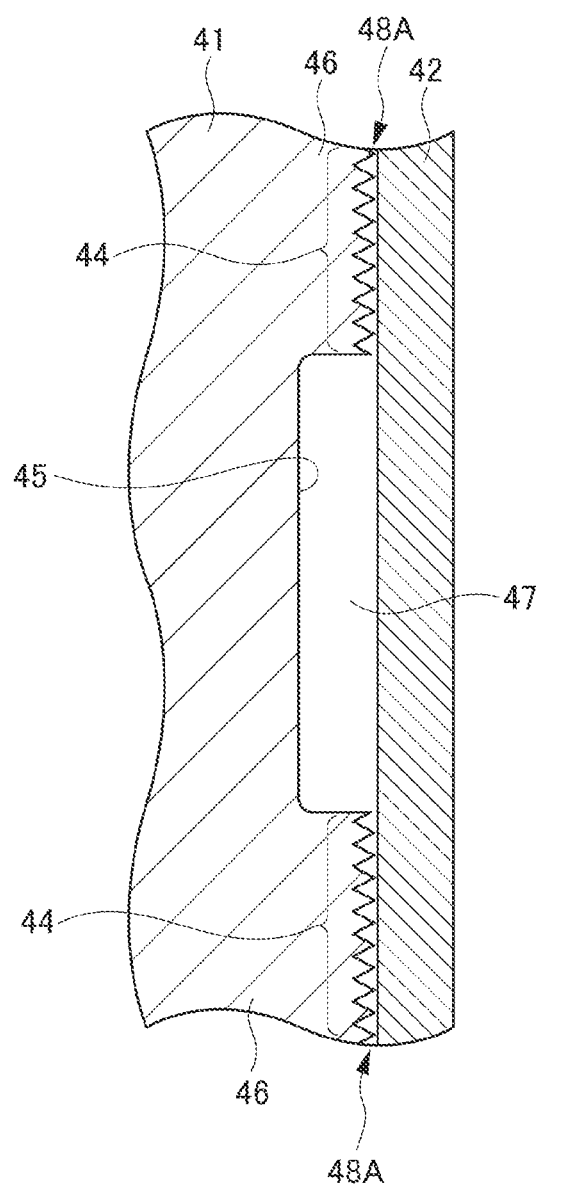
FIG. 6 is an enlarged longitudinal sectional view of a part of a build box included in a three-dimensional PBF-AM apparatus according to a second embodiment of the present invention.

Next, a second embodiment of the present invention will be described. In addition, the second embodiment of the present invention is different from the first embodiment described above in the structure of the side wall portion 40 of the build box 20. Specifically, in the second embodiment of the present invention, as illustrated in FIG. 6, between the inner pipe 41 and the outer pipe 42 constituting the side wall portion 40 of the build box 20, a fine unevenness 44 is formed on a top surface of the ridge units 46, which is a part of the outer peripheral surface of the inner pipe 41, and a gap 48A is formed by the unevenness 44. Furthermore, the outer peripheral surface of the inner pipe 41 and the inner peripheral surface of the outer pipe 42 face each other with the gap 48A formed by the fine unevenness 44 except the formation portion of the groove 45.

The fine unevenness 44 may be recesses and protrusions having a sufficiently smaller height difference between the protrusion portions and the recess portions than the depth of the groove 45 such that the refrigerant preferentially flows into the groove 45 when the refrigerant is supplied from one end side in the length direction of the groove 45. Specifically, the depth of the groove 45 may be on the order of mm (for example, several mm to ten-something of mm), and the height difference of the unevenness 44 may be on the order of μm (for example, several μm to tens of μm). The fine unevenness 44 may be formed by mechanically or chemically roughening the top surface of the ridge units 46.

By forming the fine unevenness 44 on the top surface of the ridge units 46 in this manner, the following effects in addition to the same effects as in the case of the first embodiment, can be obtained.

To start with, when the inner peripheral surface of the outer pipe 42 is brought into contact with the outer peripheral surface of the inner pipe 41, the gap 48A due to the fine unevenness 44 can be secured between the inner pipe 41 and the outer pipe 42. Furthermore, the ridge units 46 of the inner pipe 41 and the inner peripheral surface of the outer pipe 42 are brought into point contact or line contact by the fine unevenness 44. Therefore, a contact area between the inner pipe 41 and the outer pipe 42 can be reduced as much as possible to suppress the transfer of heat from the inner pipe 41 to the outer pipe 42. Moreover, when the inner pipe 41 is covered with the outer pipe 42, the shape of the outer pipe 42 can be held by the fine unevenness 44. In addition, when the groove 45 is vacuumed, the deformation and sticking of the outer pipe 42 can be suppressed by the presence of the fine unevenness 44.

Furthermore, in the second embodiment above, the fine unevenness 44 are formed on the top surface of the ridge units 46 of the inner pipe 41, but the present invention is not limited thereto, and fine irregularities may be formed on the inner peripheral surface of the outer pipe 42.

Third Embodiment

Figure 7:
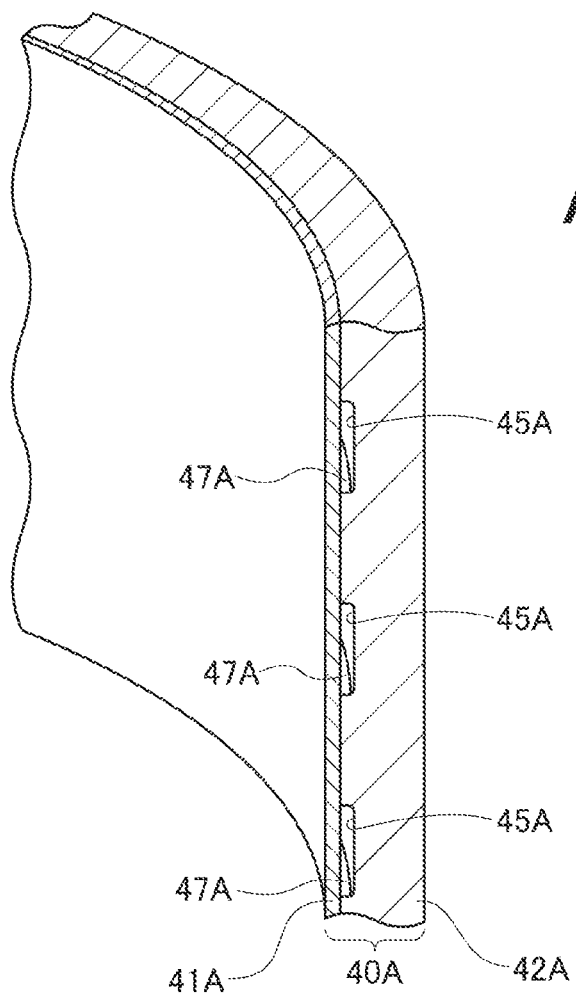
FIG. 7 is an enlarged longitudinal sectional view of a part of a build box included in the three-dimensional PBF-AM apparatus according to a third embodiment of the present invention.

Next, the third embodiment of the present invention will be described. In addition, the third embodiment of the present invention is different from the first embodiment described above in the structure of the side wall portion 40 of the build box 20. Specifically, in the third embodiment of the present invention, as illustrated in FIG. 7, a spiral groove 45A is formed in the inner peripheral surface of an outer pipe 42A, and a space 47A is formed inside a side wall portion 40A by the groove 45A. Even in a case where such a configuration is adopted, the same effects as those of the first embodiment can be obtained.

Modifications and the Like

The technical scope of the present invention is not limited to the embodiment described above, and includes a mode in which various modifications and improvements are added within a range in which specific effects obtained by the constituent elements of the invention and the combination thereof can be derived.

For example, in the first embodiment and the second embodiment, the groove 45 is formed on the outer peripheral surface of the inner pipe 41, and in the third embodiment, the groove 45A is formed on the inner peripheral surface of the outer pipe 42A; however, the present invention is not limited thereto, and the groove may be formed on both the outer peripheral surface of the inner pipe and the inner peripheral surface of the outer pipe.

Furthermore, in the second embodiment, the fine unevenness 44 is formed on the top surfaces of the ridge units 46, but the same technical idea can be applied to the third embodiment above. Specifically, in the inner peripheral surface of the outer pipe 42A illustrated in FIG. 7, fine irregularities may be formed on a surface excluding the formation portion of the groove 45A, or the fine irregularities may be formed on the outer peripheral surface of the inner pipe 41A.

Moreover, in each embodiment described above, the side wall portions 40 and 40A of the build box 20 have the two-layer structure, but the present invention is not limited thereto, and the side wall portions 40 and 40A of the build box 20 may have a multilayer structure of three or more layers.

The invention claimed is:

1. A three-dimensional powder bed fusion additive manufacturing (PBF-AM) apparatus, comprising:
    a stage on which a powder material is spread; and
    a tubular build box disposed in a state of surrounding the stage,
    wherein
    the build box comprises a side wall portion having a first tubular member surrounding the stage and a second tubular member surrounding the stage with the first tubular member interposed therebetween and forming a space with the first tubular member, and is configured to be able to form a vacuum heat insulating layer inside the side wall portion by vacuuming the space,
    a groove is formed on at least one of an outer surface of the first tubular member and an inner surface of the second tubular member, and the space is formed by the groove,
    the outer surface of the first tubular member and the inner surface of the second tubular member face each other with a gap interposed therebetween except for a formation portion of the groove,
    a vacuum pump vacuums the groove and a refrigerant supply unit supplies a refrigerant to the groove, and
    an upper end portion and a lower end portion of the tubular build box are sealed.

2. The three-dimensional PBF-AM apparatus according to claim 1, wherein
    the groove is formed in a spiral shape.

3. The three-dimensional PBF-AM apparatus according to claim 1, wherein
    the gap is formed by a fine unevenness formed on at least one surface of an outer surface of the first tubular member and an inner surface of the second tubular member.

4. The three-dimensional PBF-AM apparatus according to claim 1, comprising:
    a first connection pipe connected to one end side in a length direction of the groove;
    a second connection pipe connected to the other end side in the length direction of the groove; and
    a plurality of valves provided in the first connection pipe and the second connection pipe,
    wherein a state in which the groove is vacuumed and a state in which the refrigerant is supplied to the groove are switchable by opening and closing the plurality of valves.

* * * * *